US012752857B2

(12) United States Patent
Nagasawa

(10) Patent No.: US 12,752,857 B2
(45) Date of Patent: Oct. 6, 2026

(54) FRONT FRAME STRUCTURE FOR ELECTRIC VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 309 days.

(21) Appl. No.: 18/429,980

(22) Filed: Feb. 1, 2024

(65) Prior Publication Data

US 2024/0278843 A1 Aug. 22, 2024

(30) Foreign Application Priority Data

Feb. 21, 2023 (JP) ................................ 2023-025424

(51) Int. Cl.
*B62D 25/08* (2006.01)
*B62D 21/15* (2006.01)

(52) U.S. Cl.
CPC ......... *B62D 25/085* (2013.01); *B62D 21/155* (2013.01); *B62D 25/082* (2013.01)

(58) Field of Classification Search
None
See application file for complete search history.

(56) References Cited

FOREIGN PATENT DOCUMENTS

JP 2012-201284 A 10/2012
WO WO-2014097513 A1 * 6/2014 ............ B62D 21/11

OTHER PUBLICATIONS

Translation of WO2014097513 (Year: 2014).*
Translation of WO201497513 (Year: 2014).*

* cited by examiner

*Primary Examiner* — Nicholas McFall
(74) *Attorney, Agent, or Firm* — Smith, Gambrell & Russell, LLP

(57) ABSTRACT

A front frame structure for an electric vehicle includes: front side frames extending in a front-rear direction of a vehicle body and disposed on both sides in a vehicle width direction of a motor room in a front portion of the vehicle body; impact absorbing members disposed at front ends of the front side frames; a bumper beam coupling the impact absorbing members; and a lower frame disposed in a lower portion of the motor room and having both sides supported by the front side frames. The front side frames are in extra spaces each defined with a side wall of the motor room and a side surface a power control unit. A frame-shaped rigid member is disposed in an extra space in a front of the motor room. The front side frames and the impact absorbing members are coupled respectively to rear and front surfaces of the rigid member.

8 Claims, 5 Drawing Sheets

FRONT FRAME STRUCTURE FOR ELECTRIC VEHICLE

CROSS-REFERENCE TO RELATED APPLICATIONS

The present application claims priority from Japanese Patent Application No. 2023-025424 filed on Feb. 21, 2023, the entire contents of which are hereby incorporated by reference.

BACKGROUND

The disclosure relates to a front frame structure for an electric vehicle.

A power unit including an electric motor is mounted in a motor room provided in a front portion of an electric vehicle. In an event of a full-wrap frontal collision or a small-overlap frontal collision, it is almost impossible for the power unit to absorb impact energy because the power unit is a rigid body. Since the power unit of the electric vehicle is smaller in size than a power unit of a reciprocating engine, a control unit including high-voltage members such as an inverter and a direct current-direct current (DC/DC) converter is often mounted above the power unit.

If the power unit, which is a rigid body, is retreated by an impact in an event of a frontal collision, a cabin may be deformed. The control unit, which is a high-voltage member, may be crushed by the impact in the event of the frontal collision. Thus, in the event of the frontal collision, the impact energy in the event of the frontal collision is to be absorbed at least in front of the power control unit in which the power unit and the control unit are integrated.

The electric vehicle uses a large-capacity battery to ensure a sufficient cruising distance. In many cases, an entire space under a floor is ensured as a battery chamber, and a battery is accommodated in the battery chamber. Thus, in an event of a frontal collision, deformation of the cabin and the battery chamber is to be reduced for effective protection.

For example, Japanese Unexamined Patent Application Publication (JP-A) No. 2012-201284 discloses an electric vehicle in which one main frame extending in a front-rear direction of a vehicle body is disposed at the center in a vehicle width direction of the vehicle body, and a battery is accommodated in the main frame. In the electric vehicle disclosed in JP-A No. 2012-201284, the battery is not accommodated in a portion of the main frame extending forward with respect to front wheels, and impact energy is absorbed by the portion extending forward with respect to the front wheels in an event of a frontal collision.

SUMMARY

An aspect of the disclosure provides a front frame structure for an electric vehicle. The electric vehicle includes front side frames in a pair, impact absorbing members, a bumper beam, and a lower frame. The front side frames extending in a front-rear direction of a vehicle body of the electric vehicle and are disposed respectively on both sides in a vehicle width direction of a motor room provided in a front portion of the vehicle body. The impact absorbing members are disposed at respective front ends of the front side frames. The bumper beam couples the impact absorbing members. The lower frame is disposed in a lower portion of the motor room. Both sides in the vehicle width direction of the lower frame are supported by the front side frames respectively. A power control unit including an electric motor is supported on a rear portion of the lower frame. The front side frames are respectively disposed in extra spaces that are each defined with a side wall in the vehicle width direction of the motor room and a side surface of the power control unit. A frame-shaped rigid member is disposed in an extra space in a front portion of the motor room. The front side frames are coupled to a rear surface of the frame-shaped rigid member. The impact absorbing members are coupled to a front surface of the frame-shaped rigid member.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The electric vehicle disclosed in JP-A No. 2012-201284 is originally designed as a dedicated frame structure. Thus, cost may increase as compared with a frame structure for an electric vehicle designed based on a front frame structure that is used for a vehicle in which a conventional reciprocating engine is mounted.

When impact energy in an event of a frontal collision is to be absorbed by a front end portion of the main frame, a crush stroke (an expected amount of plastic deformation in a collision direction in the event of the frontal collision) of the main frame is set to be forward with respect to a power unit. However, when the crush stroke is to be ensured by the deformation of the main frame, a front overhang amount to the front with respect to the power unit increases, and design may be impaired.

It is desirable to provide a front frame structure for an electric vehicle. The front frame structure can be designed based on a front frame structure that is used for a vehicle in which a conventional reciprocating engine is mounted, and can effectively protect a power control unit, and a cabin or a battery chamber from an impact load in an event of a frontal collision without impairing design.

An embodiment of the disclosure will be described below with reference to the drawings. In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
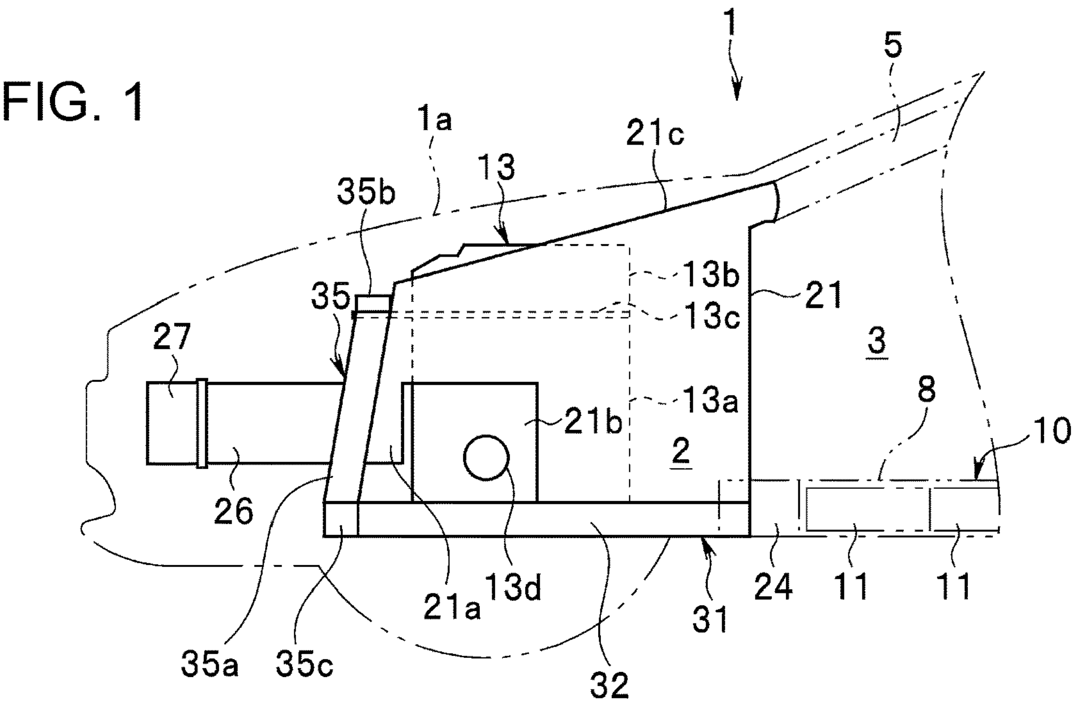
FIG. 1 is a side view illustrating a front frame structure.
Figure 2:
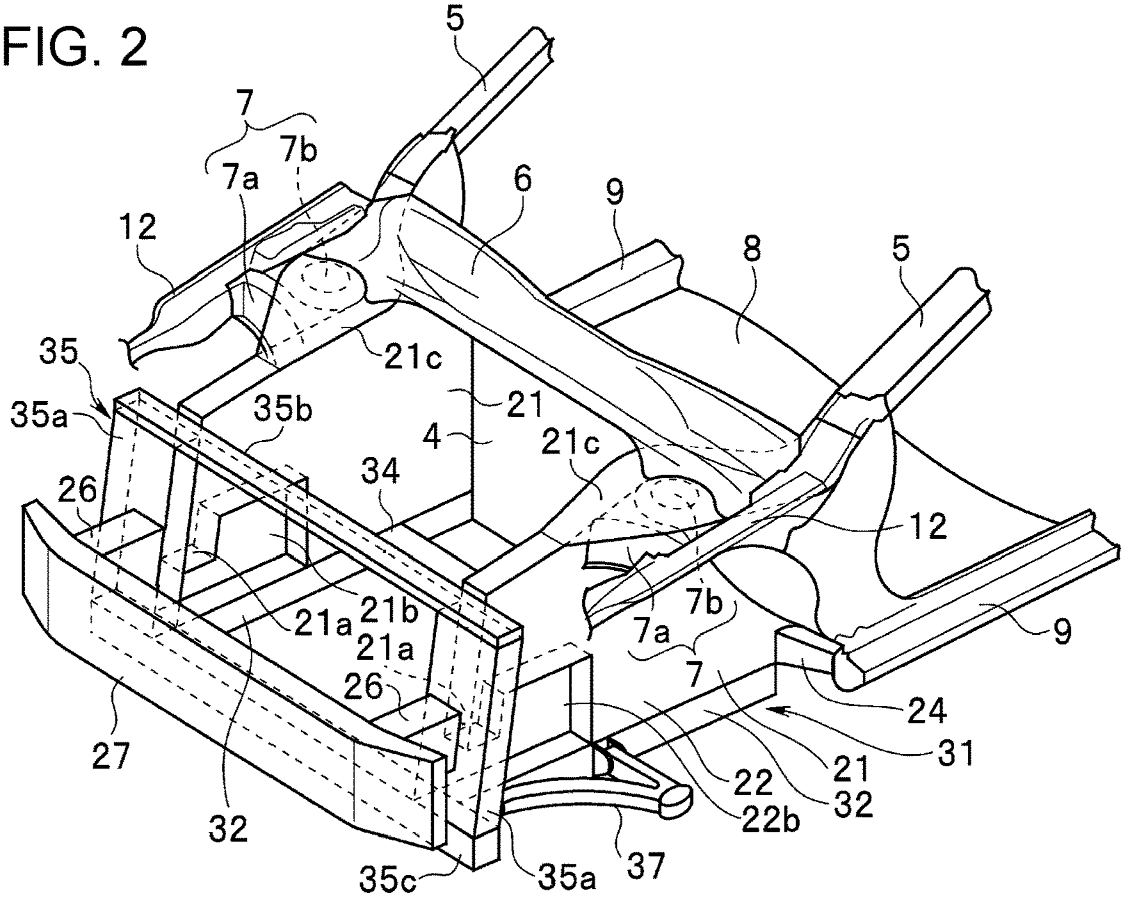
FIG. 2 is a perspective view illustrating the front frame structure.

FIGS. 1 and 2 illustrate a frame structure of a vehicle body front portion 1 in an electric vehicle. A motor room 2 is provided in the vehicle body front portion 1. An upper opening of the motor room 2 is covered with a front hood la that can be opened and closed.

A cabin 3 is provided in rear of the motor room 2. The motor room 2 and the cabin 3 are partitioned via a toe board 4 extending in a vehicle width direction. In the following description, when a term “weld-join” is used, the joining method is performed by welding using a welding method typified by spot welding unless otherwise specified.

Both left and right side edges of the toe board 4 are weld-joined to a pair of opposite front pillars 5. An upper end edge of the toe board 4 is weld-joined to a bulkhead 6 extending in the vehicle width direction. A pair of wheel aprons 7 opposite to each other are provided at front portions on both sides of the toe board 4. A lower portion of the toe board 4 is continuous with a front end edge of a floor panel 8. The floor panel 8 corresponds to a floor surface of the cabin 3.

Both sides in the vehicle width direction of the floor panel 8 are weld-joined to a pair of side sills 9. The side sills 9 extend in a front-rear direction of the vehicle body on left and right side portions of the floor panel 8. Front portions of the side sills 9 are weld-joined to lower end portions of the front pillars 5. Upper portions of the left and right front pillars 5 extend upward of the vehicle body in a state of being inclined rearward, and are weld-joined to front end portions of roof side rails (not illustrated).

A battery chamber 10 is provided substantially entirely under a lower surface of the floor panel 8. The battery chamber 10 is a sealed container. Multiple battery modules 11 are disposed in the battery chamber 10. Each of the battery modules 11 stores electric energy for driving a traveling electric motor.

The pair of wheel aprons 7 opposite to each other form side walls of the motor room 2. Each of the wheel aprons 7 is provided with an arch-shaped wheel house 7*a* that covers an upper side of a front wheel Wf (see FIGS. 5A to 5C), a suspension tower 7*b* that supports an upper portion of a strut of a suspension (not illustrated) that suspends the front wheel Wf, and the like. The suspension tower 7*b* is disposed at a relatively rear portion of the motor room 2, and protrudes inward in the vehicle width direction of the motor room 2.

An upper end portion of the wheel apron 7 is weld-joined to an upper side frame 12. A rear end of the upper side frame 12 is weld-joined to the front pillar 5. An outer side in the vehicle width direction of the suspension tower 7*b* is weld-joined to the upper side frame 12. Portions between the left and right front pillars 5 are weld-joined to both end portions of the bulkhead 6. Both the end portions of the bulkhead 6 are weld-joined to the left and right wheel aprons 7. The suspension tower 7*b* may be a strut tower.

A front frame structure of an electric vehicle is designed based on a front frame structure of a vehicle in which a conventional reciprocating engine is mounted. A power control unit including an electric motor and a transmission is smaller in size than a power unit of a reciprocating engine. Thus, many electric vehicles adopt a structure in which a control unit 13*b* including high-voltage members such as an inverter and a DC/DC converter is mounted above a power unit 13*a*. The control unit 13*b* is fixed on a bracket 13*c*, and the bracket 13*c* is fixed on the power unit 13*a*.

Thus, in the electric vehicles, a proportion of a volume (volume occupancy) of a power control unit 13 in which the power unit 13*a* and the control unit 13*b* are integrated in the motor room 2 is lower than a volume occupancy of a power unit using a reciprocating engine as a driving source in an engine room having the same volume as the motor room 2. As a result, in the motor room 2, extra spaces are formed between left and right side walls of the motor room 2 and side surfaces of the power control unit 13 facing the left and right side walls. Further, an extra space is also formed in front of the power control unit 13.

In the present embodiment, a framework of the front frame structure is reconstructed by utilizing the extra spaces generated in the motor room 2. With this reconstruction, impact energy in an event of a full-wrap frontal collision or a small-overlap frontal collision can be efficiently absorbed in front of the power control unit 13.

First, front side frames 21 are reconstructed. The reconstructed front side frames 21 are disposed in the extra spaces formed between side surfaces in the vehicle width direction of the power control unit 13 and inner surfaces in the vehicle width direction of the wheel aprons 7 in the motor room 2. The front side frames 21 extend in the front-rear direction of the vehicle body. Rear portions of the front side frames 21 are weld-joined to both portions in the vehicle width direction of a toe board cross member (not illustrated) that reinforces the toe board 4. Front surfaces of the front side frames 21 are coupled to vertical frames 35*a* provided in a front rigid frame 35. The configuration of the front rigid frame 35 will be described later.

Each of the front side frames 21 is has a wall shape having substantially a dimension in a height direction from a bottom portion to an upper portion of the motor room 2. The front side frame 21 has a hollow cross section. For example, the front side frame 21 has a dimension from the bottom portion of the motor room 2 to a height substantially the same as the height of the upper side frame 12 in the height direction of the vehicle body. Rear ends of the front side frames 21 are weld-joined to both ends of the toe board cross member (not illustrated) of the toe board 4. Outer sides in the vehicle width direction of the rear portions of the front side frames 21 are weld-joined to torque boxes 24. The torque boxes 24 are weld-joined to inner surfaces in the vehicle width direction of the front portions of the side sills 9.

An upper panel 21*c* is provided on an upper surface of each of the front side frames 21. The width of the upper panel 21*c* is gradually increased outward in the vehicle width direction from a middle portion toward a rear portion in the front-rear direction of the vehicle body. The upper panel 21*c* is weld-joined to an upper surface of the suspension tower 7*b*. A rear portion of the upper panel 21*c* is weld-joined to the bulkhead 6. A rear end of the upper panel 21*c* is weld-joined to the front pillar 5. Since the upper panel 21*c* is weld-joined to the upper surface of the suspension tower 7*b*, the rigidity of the suspension tower 7*b* is increased.

A lower end of a front end lower portion 21*a* of each of the left and right front side frames 21 is separated from a lower side frame 32 (described later). A space 21*b* is provided behind the front end lower portion 21*a*, and a space below the front end lower portion 21*a* communicates with the space 21*b*. The space 21*b* has a rectangular shape whose lower side is opened. The front surface of the front side frame 21 is coupled to a rear surface of the vertical frame 35*a*. A rear end of a crash box 26 serving as an impact absorbing member is coupled to a front surface of the vertical frame 35*a* at a position substantially directly facing the front end lower portion 21*a* of the front side frame 21, that is, at a position lower than the center in an up-down direction of the vertical frame 35*a*. Distal ends of the left and right crash boxes 26 are coupled to each other via a bumper beam 27 extending in the vehicle width direction. The crash box 26 is provided at the position of the center of gravity in the up-down direction of the electric vehicle. The width in the vehicle width direction of the crash box 26 is the same as the width in the vehicle width direction of the front end lower portion 21*a*.

Figure 3:
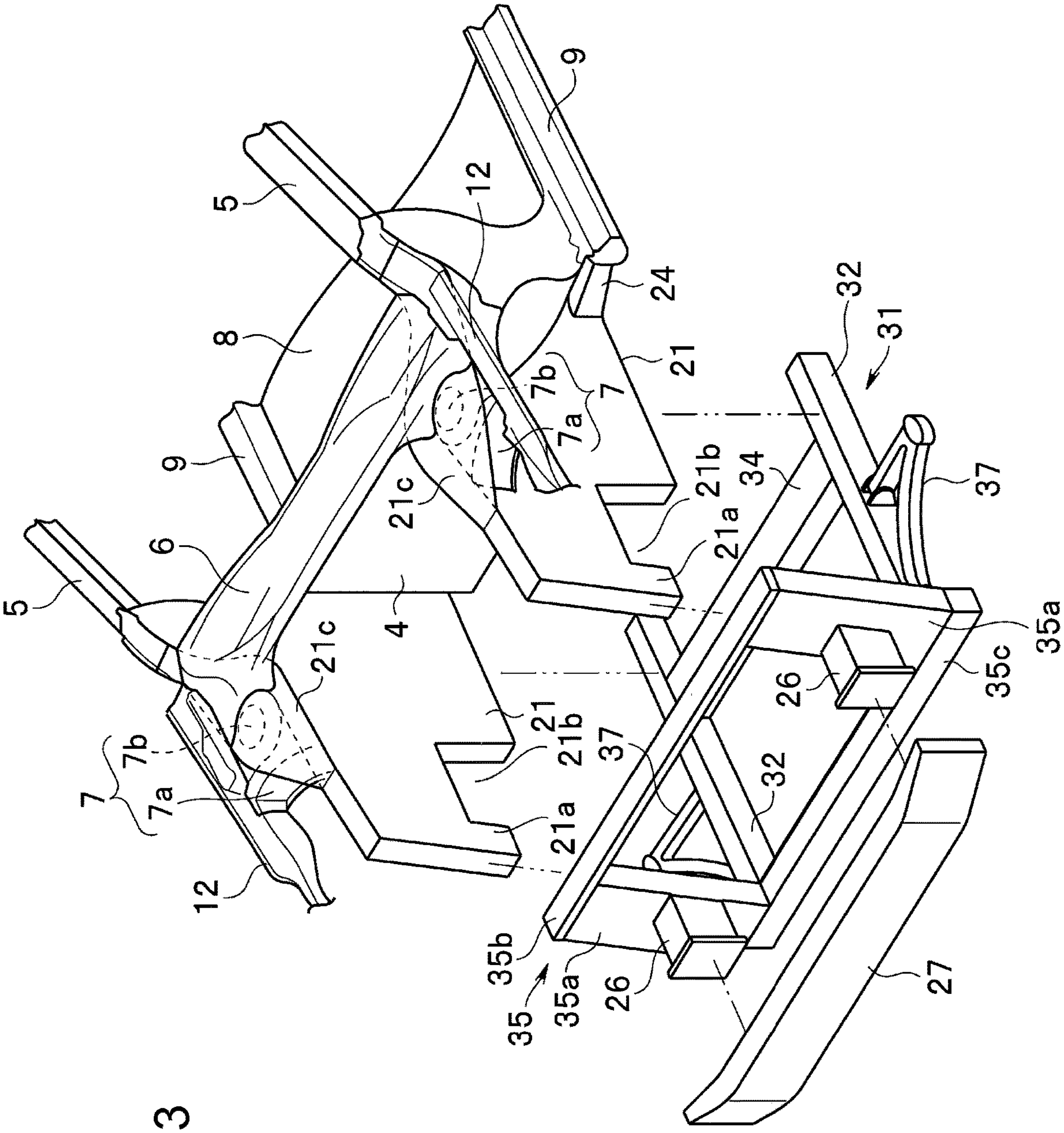
FIG. 3 is an exploded perspective view illustrating the front frame structure.

In contrast, a cradle 31 serving as a lower frame is disposed on a bottom surface of the motor room 2. As illustrated in FIG. 3, the cradle 31 includes a pair of left and right lower side frames 32, a rear cross member 34, and a front cross member 35*c* that also serves as a component of the front rigid frame 35 (described later). The lower side frames 32 and the rear and front cross members 34 and 35*c* each have in a hollow rectangular shape in cross section.

The distance between the left and right lower side frames 32 is set to be the same as the distance between the left and right front side frames 21. The front cross member 35*c* is weld-joined to front ends of the left and right lower side frames 32. Both ends of the rear cross member 34 are weld-joined to rear portions of the left and right lower side frames 32 on inner sides in the vehicle width direction.

The rear cross member 34 is formed to be slightly wide in the front-rear direction. The power control unit 13 is supported on the rear cross member 34 via a motor mount (not illustrated). An axle shaft 13*d* extends from the transmission provided in the power control unit 13 to both sides in the vehicle width direction. The width in the vehicle width direction of each of the lower side frames 32 is the same as the width in the vehicle width direction of the front side frame 21.

Lower surfaces of the front side frames 21 are coupled onto the left and right lower side frames 32, and the lower ends of the front end lower portions 21*a* are separated from the front side frames 21. The axle shaft 13*d* of the power unit 13*a* provided in the power control unit 13 penetrates through the spaces 21*b* and protrudes outward in the vehicle width direction. The height of upper surfaces of the spaces 21*b* substantially coincides with the height of upper surfaces of the crash boxes 26.

The front rigid frame 35 serving as a frame-shaped rigid member is weld-joined to the front surfaces of the front side frames 21 and the front ends of the lower side frames 32 provided in the cradle 31. The front rigid frame 35 is disposed in the extra space formed in front of the power control unit 13 disposed in the motor room 2. The front rigid frame 35 includes the pair of left and right vertical frames 35*a*, an upper cross member 35*b*, and the front cross member 35*c*.

The front cross member 35*c* is weld-joined to the front ends of the lower side frames 32 provided in the above-described cradle 31, and also serves as a component of the cradle 31. Both end portions of the front cross member 35*c* protrude outward in the vehicle width direction with respect to the lower side frames 32 within a range not exceeding the vehicle body width.

Each of the vertical frames 35*a* has a hollow rectangular-parallelepiped shape and is formed to have a relatively large width in the vehicle width direction. Outer end portions in the vehicle width direction of the vertical frames 35*a* substantially coincide with end portions of the front cross member 35*c*. Inner end portions in the vehicle width direction of the vertical frames 35*a* substantially coincide with inner side surfaces of the front side frames 21. End portions of the front side frames 21 and the outer end portions in the vehicle width direction of the vertical frames 35*a* protrude forward of the front wheels Wf.

Each of the vertical frames 35*a* is weld-joined to the front side frame 21 in a state in which an upper portion of the vertical frame 35*a* is inclined rearward of the vehicle body. The front end lower portion 21*a* of the front side frame 21 has a narrower front-rear width at a ridge portion formed with an upper end of the space 21*b* than that at a lower end due to the inclination of the vertical frame 35*a*. In an event of a frontal collision, an impact load is concentrated on the ridge portion formed at the front end lower portion 21*a*, and a trigger for deformation is given. Thus, the front end lower portion 21*a* serves as a fragile portion.

Upper ends of the left and right vertical frames 35*a* are weld-joined to both ends of the upper cross member 35*b*. In a front portion of the motor room 2, a frame-shaped structure is formed by the front rigid frame 35. A front portion of the bracket 13*c* that fixes the control unit 13*b* is fixed to the upper cross member 35*b*.

Bottom surfaces of the left and right front side frames 21 are coupled to upper surfaces of the left and right lower side frames 32 via fastening members such as bolts. Rear end portions of the left and right lower side frames 32 on the outer sides in the vehicle width direction are coupled to the torque boxes 24 via fastening members such as bolts. Rear ends of the left and right lower side frames 32 are coupled to a floor cross member (not illustrated). The floor cross member is weld-joined to the toe board 4.

Figure 4A:
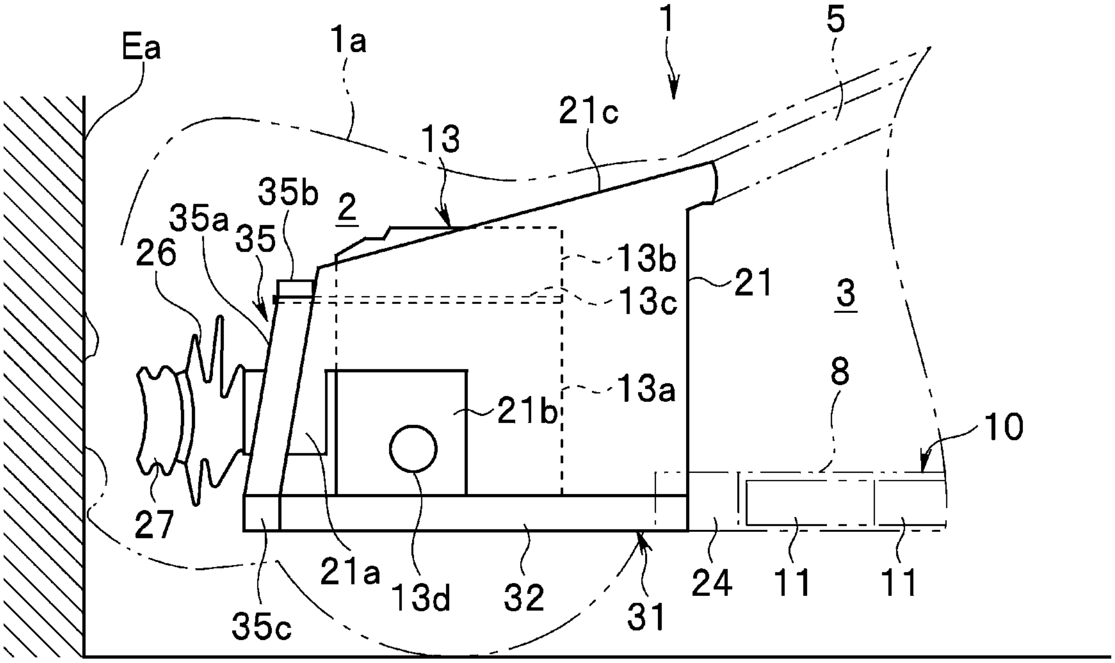
FIG. 4A is a side view illustrating a behavior of a front frame from an initial stage of a full-wrap frontal collision to a middle stage of the collision.
Figure 4B:
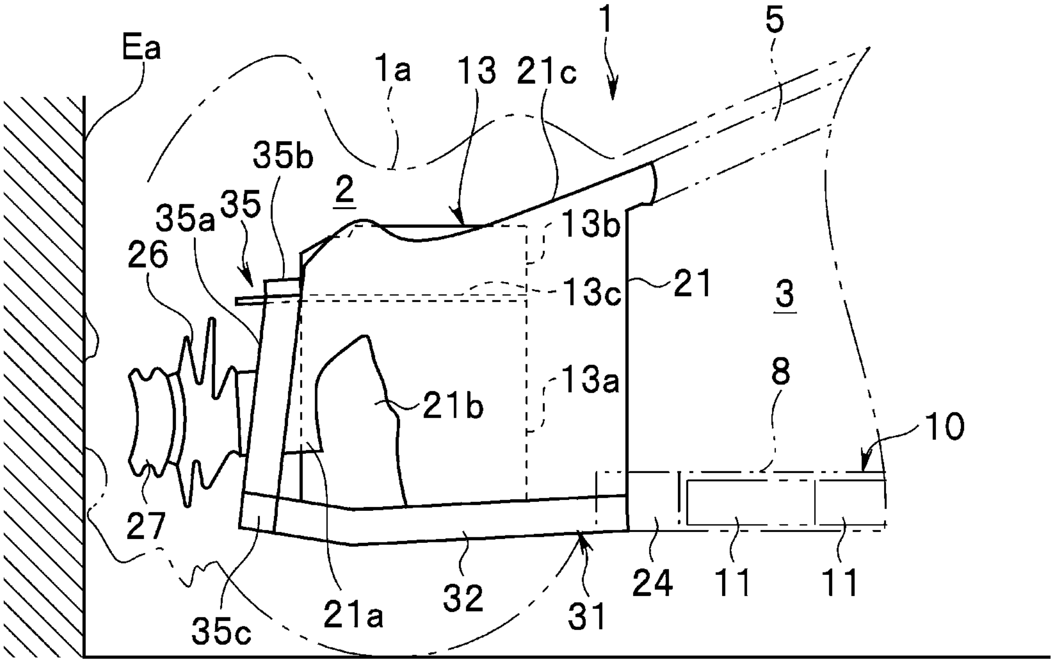
FIG. 4B is a side view illustrating a behavior of the front frame in a final stage of the full-wrap frontal collision.

As illustrated in FIGS. 4A and 4B, the front rigid frame 35 faces a front portion of the power control unit 13. The front rigid frame 35 is a rigid body. Thus, an impact load to be received by the front rigid frame 35 in an event of a frontal collision is received by the left and right vertical frames 35*a* as a surface pressure. Then, the vertical frames 35*a* entirely press the front side frames 21, bend the front end lower portions 21*a*, and deform the spaces 21*b*. Since the front side frames 21 each have a wall shape, the rear portions of the front side frames 21 are less likely to be crushed. The rear portions of the front side frames 21 can protect the power control unit 13 from the impact load in the event of the frontal collision.

Suspension arms (lower arms) 37 are supported on the outer sides in the vehicle width direction of the lower side frames 32 so as to be swingable in the up-down direction. Each of the suspension arms 37 cooperates with an upper arm (not illustrated) to suspend the front wheel Wf connected to the axle shaft 13*d*. The crash box 26, the front side frame 21, and the lower side frame 32 have the same width in the vehicle width direction.

Next, with reference to FIGS. 4A and 4B, a description will be given of an operation when an electric vehicle including such a front frame structure collides with a three-dimensional obstacle Ea in an event of a full-wrap frontal collision.

In the front frame structure according to this embodiment, the reconstructed front side frames 21 are disposed in the left and right extra spaces in the motor room 2. The front rigid frame 35 is disposed in the extra space in the front portion of the motor room 2. The lower surfaces of the front side frames 21 are coupled to the lower side frames 32 of the cradle 31, and the front surfaces of the front side frames 21 are coupled to the vertical frames 35*a* of the front rigid frame 35.

When a front surface of the traveling electric vehicle collides with the three-dimensional obstacle Ea in a full-wrap frontal collision, the impact load at that time is transmitted to the left and right crash boxes 26 via the bumper beam 27 provided laterally in the vehicle width direction.

Then, from an initial stage to a middle stage of the collision, as illustrated in FIG. 4A, the bumper beam 27 and the crash boxes 26 receive a reaction force from the front rigid frame 35, the bumper beam 27 is compressed and deformed, and the crash boxes 26 are axially crushed to absorb impact energy.

In a final stage of the collision after the crash boxes 26 are completely crushed, the impact load is transmitted to the vertical frames 35*a*. The crash boxes 26 are coupled to the position lower than the center in the up-down direction of the vertical frames 35*a*. The upper portions of the vertical frames 35*a* are inclined rearward of the vehicle body.

Thus, the lower portion sides of the vertical frames 35*a* receiving the impact load from the crash boxes 26 press the front cross member 35*c* of the cradle 31. The front cross member 35*c* receiving the impact load from the vertical frames 35*a* is buckled at portions exposed to the spaces 21*b*.

The front end lower portions 21*a* of the front side frames 21 facing the crash boxes 26 are given of a trigger for deformation because the load is concentrated on the ridge portions formed by the front end lower portions 21*a* and the upper portions of the spaces 21*b*. Then, the lower portion sides of the front end lower portions 21*a* are pressed rearward and deformed. Thereafter, the vertical frames 35*a* press the entire front surfaces of the front side frames 21 to deform the spaces 21*b,* thereby absorbing the final impact load energy. The front side frames 21 absorb the impact energy by deformation of the spaces 21*b* provided in the front portions. Since the rear portions of the front side frames 21 each have a wall shape, the rear portions are less likely to be crushed even when the impact load is applied thereto.

As a result, the rear portions of the front side frames 21 can protect the power control unit 13 from the impact load in the event of the collision. Since the final impact energy is absorbed by the deformation of the spaces 21*b* provided in the front portions of the front side frames 21, it is possible to effectively protect the cabin 3 and the battery chamber 10 from the impact in the event of the collision.

Next, an operation when an electric vehicle collides with a columnar obstacle Eb such as a utility pole in an event of a small-overlap frontal collision will be described with reference to FIGS. 5A to 5C. In the following description, a case where a left end portion of a vehicle body front portion collides will be described as an example.

Both the end portions of the front cross member 35*c* of the cradle 31 protrude in the vehicle width direction within a range not exceeding the vehicle body width. The vertical frames 35*a* of the front rigid frame 35 are joined to the end portions of the front cross member 35*c*. The vertical frames 35*a* each have a relatively large width.

Figure 5A:
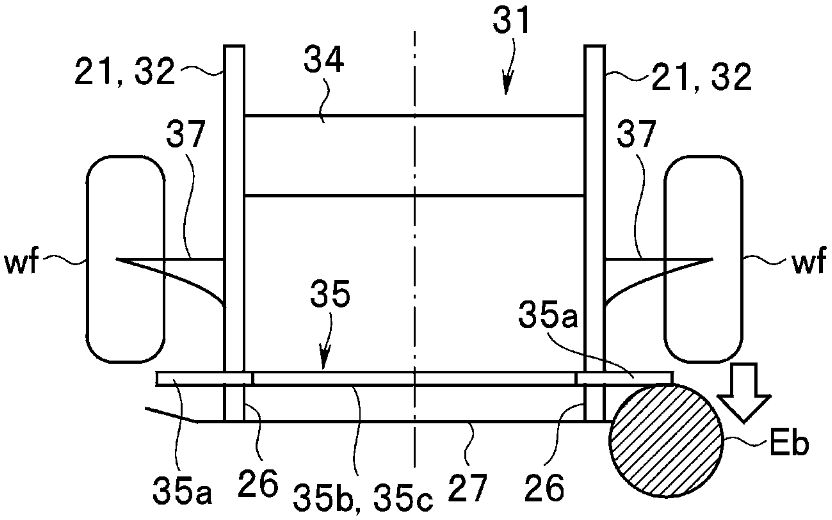
FIG. 5A is a plan view illustrating a behavior of a front frame in an initial stage of a small-overlap frontal collision.
Figure 5B:
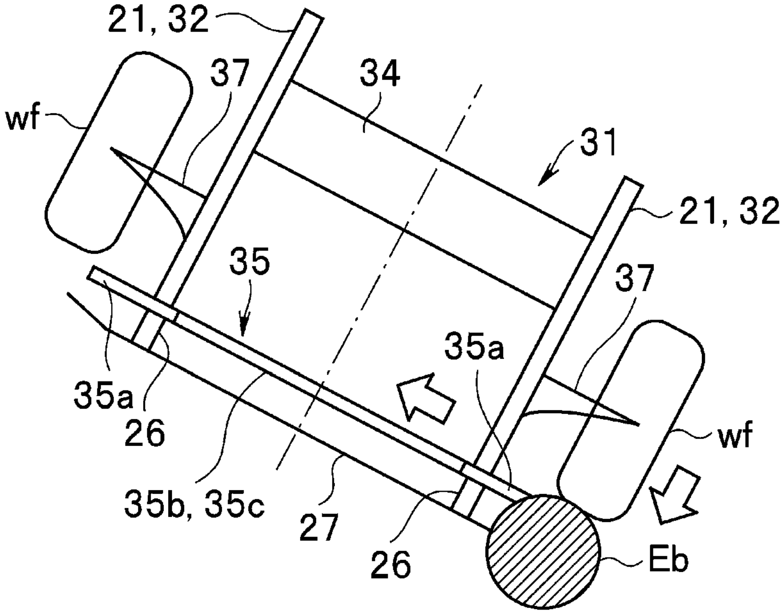
FIG. 5B is a plan view illustrating a behavior of the front frame in a middle stage of the small-overlap frontal collision.
Figure 5C:
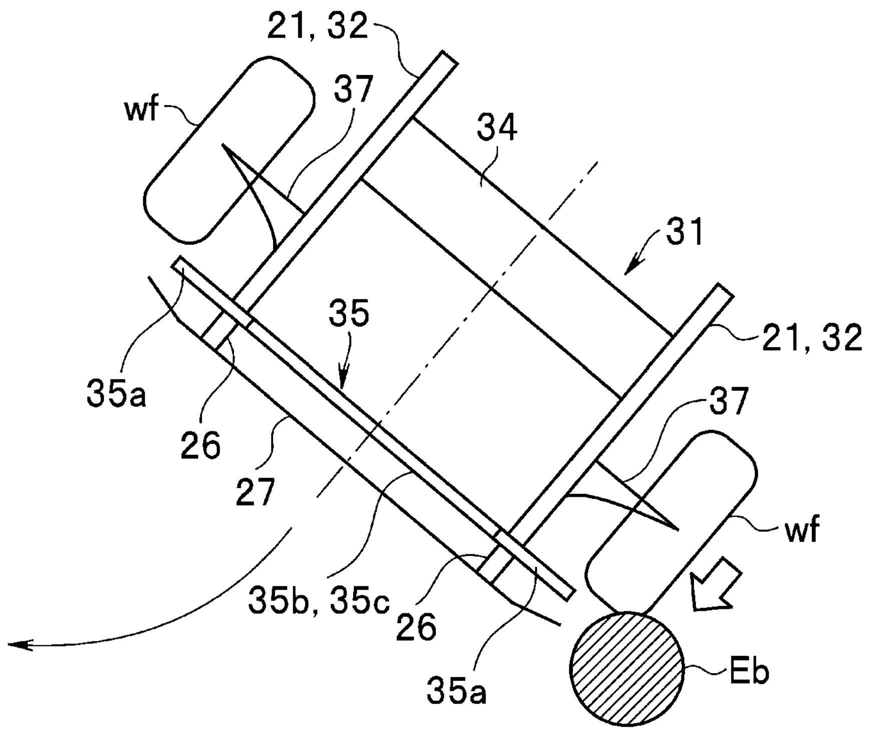
FIG. 5C is a plan view illustrating a behavior of the front frame in a final stage of the small-overlap frontal collision.

When a left end portion of the bumper beam 27 provided in the electric vehicle collides with the columnar obstacle Eb in an event of a small-overlap frontal collision, the end portion of the bumper beam 27 is first bent by a reaction force that is received from the columnar obstacle Eb in an initial stage of the collision as illustrated in FIG. 5A. Then, when the electric vehicle further moves forward by the thrust of the vehicle, an end portion of the front cross member 35*c* and an end portion of the vertical frame 35*a* of the front rigid frame 35 collide with the columnar obstacle Eb.

The vertical frame 35*a* and the front cross member 35*c* are rigid bodies. Thus, in a middle stage of the collision, as indicated by arrows in FIG. 5B, the impact load received by the vertical frame 35*a* and the front cross member 35*c* of the electric vehicle from the columnar obstacle Eb propagates through the front cross member 35*c* and the upper cross member 35*b* and is laterally dispersed.

The vertical frame 35*a* has a relatively large width, and the outer end portion in the vehicle width direction of the vertical frame 35*a* protrudes forward of the front wheel Wf. Thus, when the end portion of the vertical frame 35*a* collides with the columnar obstacle Eb, as illustrated by an arrow in FIG. 5C, yawing of right rotation is generated in the vehicle body. With this yawing, the collision energy is converted into kinetic energy and attenuated. Thus, the front wheel Wf of the vehicle that has collided is prevented from falling off, and an occupant can be protected from the impact load.

As described above, in the front frame structure according to the present embodiment, the front side frames 21 are reconstructed in the left and right extra spaces in the motor room 2 based on the front frame structure that is used in the vehicle in which the conventional reciprocating engine is mounted.

As a result, it is easy to design a structure for efficiently absorbing impact energy in the extra spaces, and the power control unit 13 can be protected with a volume equivalent to that of a conventional engine room. Since the crush stroke can be ensured with the volume equivalent to that of the engine room of the vehicle in which the conventional reciprocating engine is mounted, the design is not impaired.

The front rigid frame 35 is disposed in the front portion of the motor room 2, and its lower end is joined to the front cross member 35*c* of the cradle 31 to form the frame-shaped structure. The outer side in the vehicle width direction of the vertical frame 35*a* protrudes forward of the front wheel Wf. Thus, the impact energy in the event of the small-overlap collision can be efficiently absorbed in front of the front wheel Wf.

By generating yawing in the vehicle body that has received the impact load in the event of the small-overlap collision, the collision energy can be converted into kinetic energy and attenuated.

The disclosure is not limited to the above-described embodiment, and the disclosure can also be applied to, for example, an offset frontal collision that is defined between a full-wrap frontal collision and a small-overlap frontal collision.

According to the embodiment of the disclosure, based on the front frame structure that is used in the vehicle in which the conventional reciprocating engine is mounted, the front side frames are disposed in the extra spaces between the side walls in the vehicle width direction of the motor room and the side surfaces of the power control unit, the frame-shaped rigid member is disposed in the extra space in the front portion of the motor room, the front side frames are coupled to the rear surface of the frame-shaped rigid member, and the impact absorbing members are coupled to the front surface of the frame-shaped rigid member.

Accordingly, the framework of the front frame structure can be easily reconstructed. Since the front side frames and the frame-shaped rigid member are disposed using the extra spaces, the power control unit, and the cabin or the battery chamber can be effectively protected from an impact load in an event of a frontal collision without impairing the design.

The invention claimed is:

1. A front frame structure for an electric vehicle, the front frame structure comprising:

front side frames in a pair, the front side frames extending in a front-rear direction of a vehicle body of the electric vehicle and being disposed respectively on both sides in a vehicle width direction of a motor room provided in a front portion of the vehicle body; and impact absorbing members disposed at respective front ends of the front side frames;

a bumper beam coupling the impact absorbing members; and a lower frame disposed in a lower portion of the motor room, both sides in the vehicle width direction of the lower frame being supported by the front side frames respectively, wherein a power control unit comprising an electric motor is supported on a rear portion of the lower frame, wherein the front side frames are disposed respectively in extra spaces that are each defined with a side wall in the vehicle width direction of the motor room and a side surface of the power control unit, wherein a rigid frame member is disposed in an extra space in a front portion of the motor room, wherein the front side frames are coupled to a rear surface of the rigid frame member, and the impact absorbing members are coupled to a front surface of the rigid frame member, and wherein each of the front side frames has a wall shape having a dimension in a height direction from a bottom portion to an upper portion of the motor room, and wherein a fragile portion on which a stress load in an event of a frontal collision is to be concentrated is provided in a front portion of each of the front side frames.

2. The front frame structure according to claim 1, wherein the rigid frame member comprises vertical frames on a left and a right and cross members that couple upper portions and lower portions of the vertical frames, and wherein the front side frames and the impact absorbing members are coupled to the vertical frames.

3. The front frame structure according to claim 2, wherein the vertical frames each comprise an outer side in the vehicle width direction, the outer side being configured for protruding forward of a front wheel of the vehicle.

4. The front frame structure according to claim 1, wherein an upper panel is provided on an upper surface of each of the front side frames, and wherein a rear end of the upper panel is configured for being joined to a front pillar provided in the vehicle body.

5. An electric vehicle, comprising:

a front frame structure, the front frame structure comprising:

front side frames in a pair, the front side frames extending in a front-rear direction of a vehicle body of the electric vehicle and being disposed respectively on both sides in a vehicle width direction of a motor room provided in a front portion of the vehicle body; and impact absorbing members disposed at respective front ends of the front side frames;

a bumper beam coupling the impact absorbing members; and a lower frame disposed in a lower portion of the motor room, both sides in the vehicle width direction of the lower frame being supported by the front side frames respectively, wherein a power control unit comprising an electric motor is supported on a rear portion of the lower frame, wherein the front side frames are disposed respectively in extra spaces that are each defined with a side wall in the vehicle width direction of the motor room and a side surface of the power control unit, wherein a rigid frame member is disposed in an extra space in a front portion of the motor room, wherein the front side frames are coupled to a rear surface of the rigid frame member, and the impact absorbing members are coupled to a front surface of the rigid frame member, wherein the rigid frame member comprises vertical frames on a left and a right and cross members that couple upper portions and lower portions of the vertical frames, and wherein the front side frames and the impact absorbing members are coupled to the vertical frames, and wherein the vertical frames each comprise an outer side in the vehicle width direction, the outer side protruding forward of a front wheel of the vehicle.

6. An electric vehicle, comprising:

a front frame structure, the front frame structure comprising:

front side frames in a pair, the front side frames extending in a front-rear direction of a vehicle body of the electric vehicle and being disposed respectively on both sides in a vehicle width direction of a motor room provided in a front portion of the vehicle body; and impact absorbing members disposed at respective front ends of the front side frames;

a bumper beam coupling the impact absorbing members; and a lower frame disposed in a lower portion of the motor room, both sides in the vehicle width direction of the lower frame being supported by the front side frames respectively, wherein a power control unit comprising an electric motor is supported on a rear portion of the lower frame, wherein the front side frames are disposed respectively in extra spaces that are each defined with a side wall in the vehicle width direction of the motor room and a side surface of the power control unit, wherein a rigid frame member is disposed in an extra space in a front portion of the motor room, wherein the front side frames are coupled to a rear surface of the rigid frame member, and the impact absorbing members are coupled to a front surface of the rigid frame member, and wherein an upper panel is provided on an upper surface of each of the front side frames, and wherein a rear end of the upper panel is joined to a front pillar provided in the vehicle body.

7. The electric vehicle according to claim 6, wherein the rigid frame member comprises vertical frames on a left and a right and cross members that couple upper portions and lower portions of the vertical frames, and wherein the front side frames and the impact absorbing members are coupled to the vertical frames.

8. The electric vehicle according to claim 7, wherein the vertical frames each comprise an outer side in the vehicle width direction, the outer side protruding forward of a front wheel of the vehicle.

* * * * *